May 2, 1967  O. HERMANN  3,317,258
COMPENSATION FOR SPINDLE CREEP DUE TO BEARING TEMPERATURE
Filed Oct. 6, 1964
3 Sheets-Sheet 1

INVENTOR.
OTTO HERMANN
BY *Toulmin & Toulmin*
ATTORNEYS

United States Patent Office 3,317,258
Patented May 2, 1967

3,317,258
COMPENSATION FOR SPINDLE CREEP DUE TO BEARING TEMPERATURE
Otto Hermann, Cincinnati, Ohio, assignor to The R. K. Le Blond Machine Tool Company, Cincinnati, Ohio
Filed Oct. 6, 1964, Ser. No. 401,814
13 Claims. (Cl. 308—207)

This invention relates to a method and apparatus for compensating for expansion and contraction of bearings, and particularly in connection with the bearings for machine tool spindles and the like wherein it is extremely important to prevent axial movement of the spindle due to changes in bearing dimensions because of heat developed therein.

In a machine tool spindle, such as the spindle of a lathe, great reliance must be placed on the stability of the spindle in the axial direction to support workpieces being operated in the machine tool so that accurate machining results can be obtained.

The need for maintaining a high degree of accuracy has increased with the advent of tape-controlled machine tools and the like and with the increasing degree of accuracy demanded by modern machining practices.

A machine tool spindle, such as a lathe spindle, is many times loaded axially to a relatively high degree and the supporting bearings for the spindle thus usually take the form of tapered roller bearings. Tapered roller bearings not only provide strong accurate radial support for the spindle, but also provide for bearing the axial thrust imposed on the spindle. Inasmuch as the rollers of such bearings however are tapered, they must be restrained from axial movement between the races therefor, and this results in a region of sliding contact at the heel of the rollers where considerable pressure and heat can be developed. The generation of heat may become so high that failure of the bearing will result.

In addition to the generation of high temperature in the bearing for the reasons given above, another effect observed is expansion of the bearing which will tend to bring about axial movement of the supported element. If the supported element is held against axial movement, expansion of the bearing results in a greater increase in pressure between the bearing rollers and races and this will, in turn, result in even higher temperatures than existed before. Damage to the bearings can be prevented by permitting some axial movement of the bearing races relatively, but this can change the axial position of the supported element, lathe spindle or the like, which would detract from machining accuracy.

With the foregoing in mind, a primary object of the present invention is the provision of a method and apparatus for compensating for changes in a structure due to variation in the temperature of supporting bearings forming a part of the structure.

Another object of this invention is the provision of a method and apparatus for compensating for growth of tapered roller bearings due to temperature increases therein.

A particular object of the present invention is the provision, in a tapered roller bearing support spindle, of means for eliminating axial movement of the spindle due to changing temperature of the supporting roller bearings therefor.

Still another object of this invention is the provision of a method and apparatus for permitting tapered roller bearings to expand and contract under the influence of varying temperature while holding the member supported thereby in a fixed axial position at all times.

These and other objects and advantages of this invention will become more apparent upon reference to the following specification taken in connection with the accompanying drawings, in which.

Figure 1:
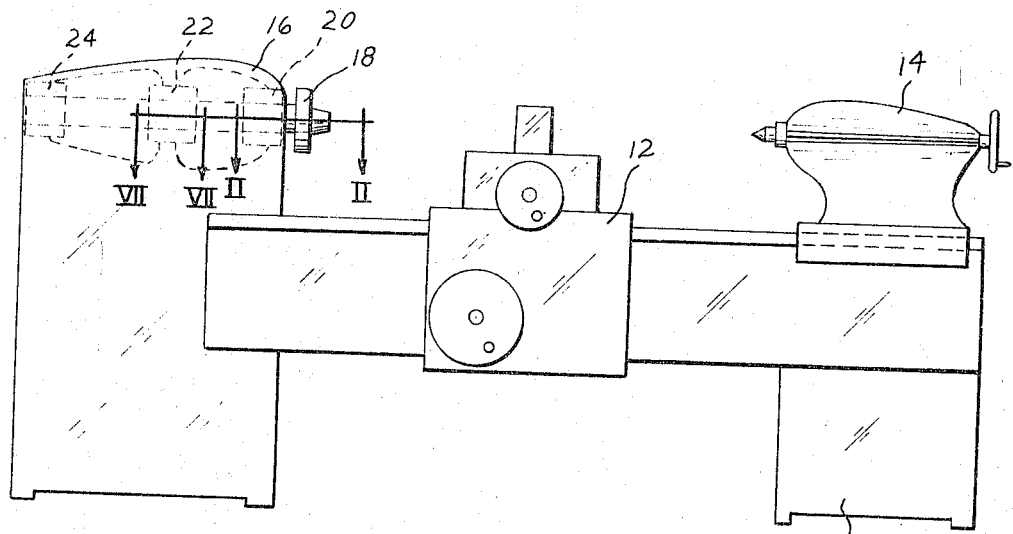
FIGURE 1 is a schematic elevational view showing a lathe structure having a spindle supported by bearing arrangements according to the present invention.

Referring to the drawings somewhat more in detail, FIGURE 1 diagrammatically illustrates a lathe having a bed 10 on which is slidably mounted a carriage 12 and which bed also carries a tailstock 14 and a headstock 16. Rotatable in headstock 16 is spindle 18 which may be driven in rotation in any suitable manner. Spindle 18 has its workpiece end supported by bearing means 20 and preferably has an intermediate bearing support 22 and a bearing support 24 at the end opposite bearing 20.

A workpiece supported by the spindle or supported between the spindle and tailstock 14 is machined by tool means carried by the carriage. In order to provide for highly accurate machining results, it is important that the workpiece thus supported be held against axial movement. Axial movement of the workpiece during machining can come about because of expansion and contraction of the spindle due to temperature changes therein, and also because of axial movement of the spindle due to expansion and contraction of the supporting bearings therefor. In general, an increase in temperature will take place in the bearings and in the spindle during operation of the lathe, and this tends to cause growth of the spindle in the direction toward tailstock 14. The support bearings for the spindle, particularly the bearings 20, must hold the spindle against axial thrusts imposed thereon, and it occurs for this reason that the aforementioned spindle growth is sometimes a combination of expansion of the spindle and expansion of the supporting bearings. The present invention deals with this problem by providing means for the bearings to expand under the influence of heat, while also permitting expansion of the spindle due to heat, and while preventing any substantial movement axially of the workpiece end of the spindle, and without any loss of support of the spindle in either a radial or axial direction.

Figure 2:
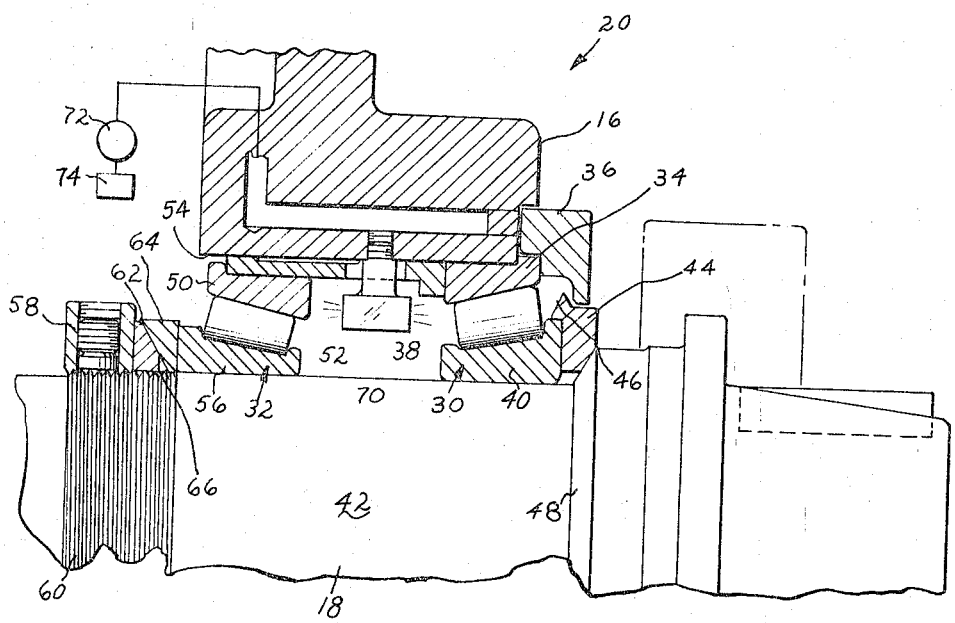
FIGURE 2 is a schematic view indicated by line II—II on FIGURE 1 showing one form of bearing support structure according to the present invention at the top end of the spindle.

Referring now to FIGURE 2, one form of spindle bearing 20 is illustrated. In FIGURE 2, there are provided the spaced anti-friction tapered roller bearings 30 and 32. Bearing 30 has an outer race 34 having a peripheral flange firmly clamped against the housing of headstock 16 by a clamp ring 36. This bearing also comprises tapered rollers 38 and an inner race 40 which is a light press fit on cylindrical portion 42 of spindle 18. Inner race 40 at its right side, which is the side toward the workpiece end of the spindle, is engaged by a ring 44 which may be turned from an aluminum bar so that it expands at a different rate than the spindle and bearing race 40 which are formed of a steel. Ring 44 at the side opposite the region of engagement thereof with race 40 has a beveled portion 46 cut off at an angle of, say, 30° and engaging a correspondingly inclined surface 48 on the spindle. Both of these surfaces are smooth and ring 44 is thus free to expand and contract under the influence of temperature. At this point it will be evident that an increase in temperature in bearing 30 which will bring about expansion thereof including expansion in the axial direction, will be at least partially compensated by expansion of ring 44, which will also be subjected to an increase in temperature, whereby thrusting of spindle 18 in the axial direction toward the workpiece is prevented. Simultaneously, the development of excessive pressures in the bearing itself are prevented so that deterioration of the bearing due to increases in temperature thereof is also prevented. By a selection of the material of ring 44 and a selection of angle A of the surfaces 46 and 48 substantially exact compensation for the influences of the temperature changes occurring in the bearings and spindles can be compensated.

The outer race 50 of bearing 32 is held in fixed spaced relation to outer race 34 of bearing 30 by sleeve 52 mounted in bore 54 of the spindle housing. The inner race 56 of bearing 32 is likewise a push fit on the cylindrical portion 42 of spindle 18 and is held in place on the spindle by clamping nut 58 mounted on threaded portion 60 of the spindle and between which nut and inner race 56 are disposed rings 62 and 64. These rings have inclined surfaces meeting at 66, and by selecting the material of ring 64 so that it has a higher co-efficient of expansion than that of ring 62, the same effect is obtained as described in connection with bearing 30, namely, that expansion of ring 64 due to increasing temperature will compensate for expansion of bearing 32 and any expansion of spindle 18.

It is also possible, with the FIGURE 2 arrangement, to transmit any expansion of outer race 34 of bearing 30 through sleeve 52 to bearing 32, and to compensate for this expansion, together with expansion of bearing 32, by ring 64. The spindle is at all times held tight in the bearings and axial shifting of at least the workpiece end of the spindle is prevented, and the development of excessive pressures in the anti-friction bearings is prevented.

Lubricant is supplied to the bearings from a spray head 70 which is supplied with lubricating oil under pressure from pump 72 connected with a source 74 of lubricating oil.

Figure 3:
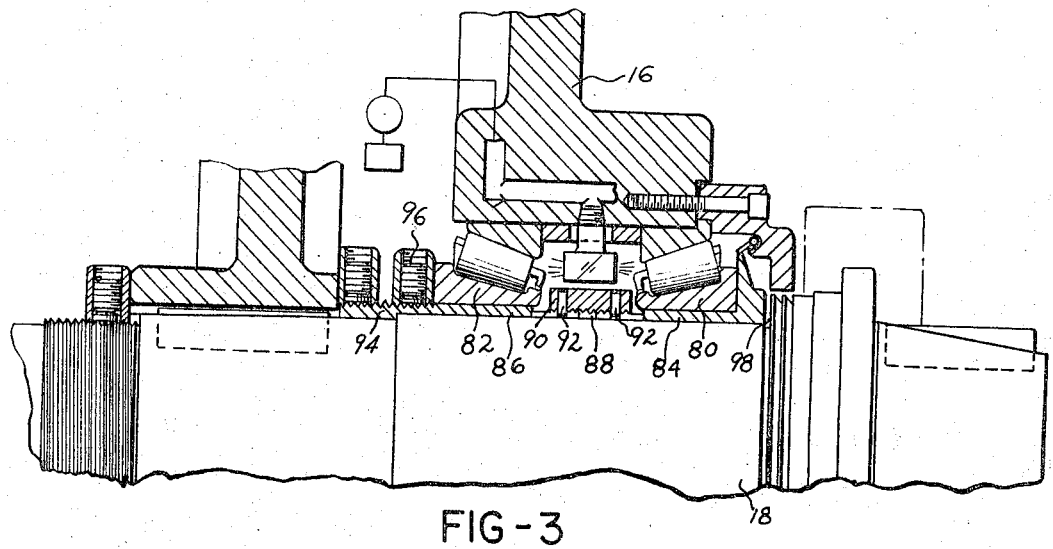
FIGURE 3 is a view like FIGURE 2 but shows a modified arrangement.

In FIGURE 3 an arrangement is illustrated which is somewhat similar to that of FIGURE 2 in that two spaced anti-friction bearings 80 and 82 are provided rotatably supporting spindle 18 in the housing of headstock 16. In FIGURE 3, however, the bearings 80 and 82 are mounted on respective sleeve members 84 and 86. Sleeve members 84 and 86 have their adjacent ends spaced apart as at 88, and these adjacent ends are threaded for receiving a threaded ring 90 which is threaded on the members and then against rotation thereon by pins 92.

At least the material of ring 90 is selected so that there will be differential expansion between the ring and the sleeve members 84 and 86 and, particularly, so that ring 90 will expand more rapidly under the influence of heat than the said sleeve members. The differential expansion referred to will bring about that, when the temperature of the assembly in the region of ring 90 increases, this ring will expand and a clearance will develop between the internal threads in the ring and the external threads on the sleeve members. This clearance will permit axial movement of the sleeve members 84 and 86 relative to each other, thus relieving the bearings 80 and 82 of any excessive pressures that might otherwise be developed therein.

At the same time, spindle 18 is fixedly located with respect to the headstock housing in the axial direction by the connection at 94 between the spindle and sleeve member 86. This sleeve member, in turn, is clamped to the inner race of bearing 82 by nut 96. Sleeve member on the other hand, has clearance at 98 into which it can expand as the temperature increases.

In the construction of FIGURE 3 therefore, it will be evident that as the bearings increase in temperature, the sleeve members 84 and 86 will move axially away from each other with sleeve member 84 slipping on the spindle, while sleeve member 82 tends to move the spindle toward the left. The spindle itself, however, also increases in temperature and tends to expand in the axial direction so that the tendency of sleeve member 86 to move the spindle to the left is compensated by the tendency for the workpiece end of the spindle to move toward the right. The workpiece end of the spindle is thus held against axial movement and a workpiece supported thereon does not shift axially as the bearing assembly and spindle heats and cools.

Figure 4:
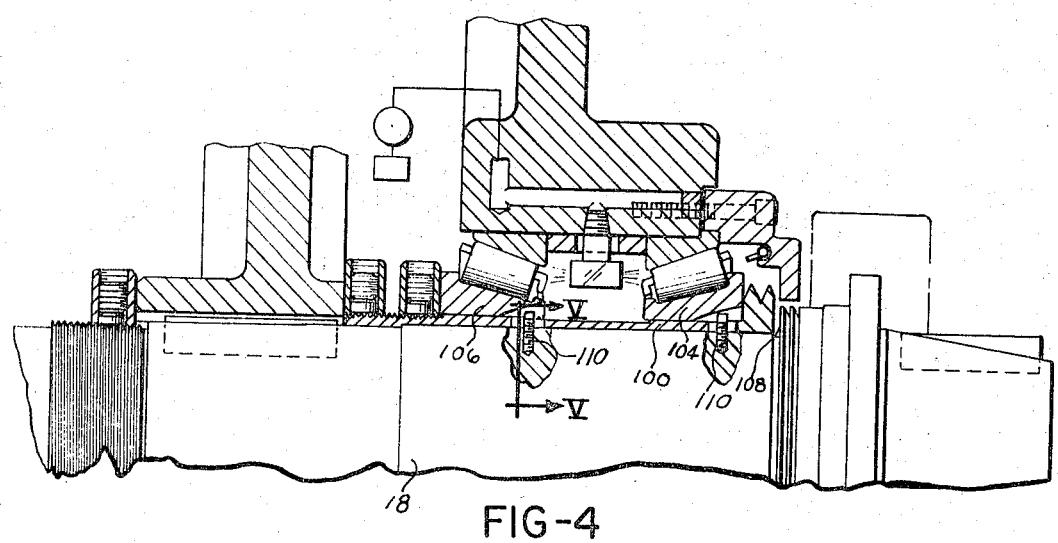
FIGURE 4 is a view like FIGURES 2 and 3 but shows another modification.
Figure 5:
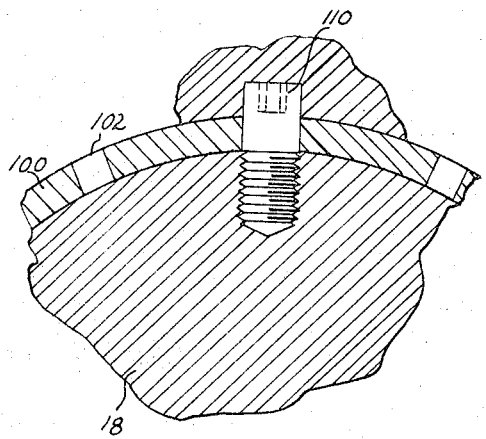
FIGURE 5 is a sectional view indicated by line V—V on FIGURE 4.

In FIGURES 4 and 5 there is shown a somewhat different arrangement wherein there is mounted on spindle 18 a sleeve 100 of a material which will expand under the influence of temperature more rapidly than the material of the spindle. A plastic material such as nylon can be employed for this purpose. Sleeve 100 is provided with axial slots 102 as will be seen in FIGURE 5, so that radial expansion of the sleeve is prevented. The sleeve, however, under the influence of a heat developed in the bearings 104 and 106 will expand in the axial direction and compensate for axial expansion of the bearings 104 and 106, and thereby prevent any axial movement of the workpiece end of spindle 18. As in connection with the FIGURE 3 modification, the right end of sleeve 100 has clearance space at 108 into which it can expand, while at the left end of the sleeve 100, there is a fixed connection thereof to the spindle. The growth of the spindle due to an increase in temperature is thus compensated for in the same manner as described in connection with FIGURE 3.

Sleeve 100 and the inner races of bearings 104 and 106 are prevented from rotation relative to each other and to the spindle by the stud elements 110 threaded into the spindle, and having portions extending through slots in sleeve 100 and into notches provided in the inner races of the said bearings.

Figure 6:
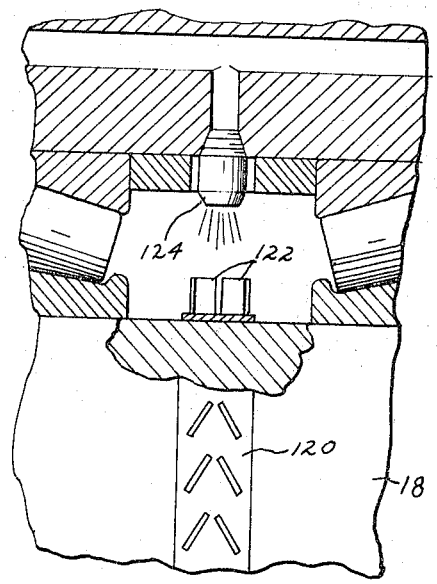
FIGURE 6 is a fragmentary view showing the employment of a fan-like device in association with the bearings to effect lubrication thereof.

In each of the previously described modifications, nozzle means have been provided for supplying lubricating oil directly on the bearings. This can sometimes lead to the accumulation of a substantial amount of lubricating oil in and around the bearings which can interfere with the operation of the spindle. In FIGURE 6, there is illustrated an arrangement which tends to maintain the oil in and around the bearings of any of the foregoing modifications at a minimum. This is accomplished by mounting a fan or impeller element 120 on spindle 18 to rotate therewith. The fan or impeller element has blade members 122 against which is directed lubricating oil from a nozzle means 124. The lubricating oil is impelled toward the bearings by the fan or impeller members, and this will tend to maintain at a minimum the amount of lubricating oil in the bearings while providing for an efficient supply of the oil to the bearings, and an arrangement which increases in efficiency with increasing speed of rotation of the spindle.

The foregoing bearing arrangements have been those provided at the workpiece end of the spindle. The bearing requirements at this particular point along the spindle are severe because of the high radial loading that can occur at this point that must be sustained as well as the axial loading of the spindle that must be sustained.

Figure 7:
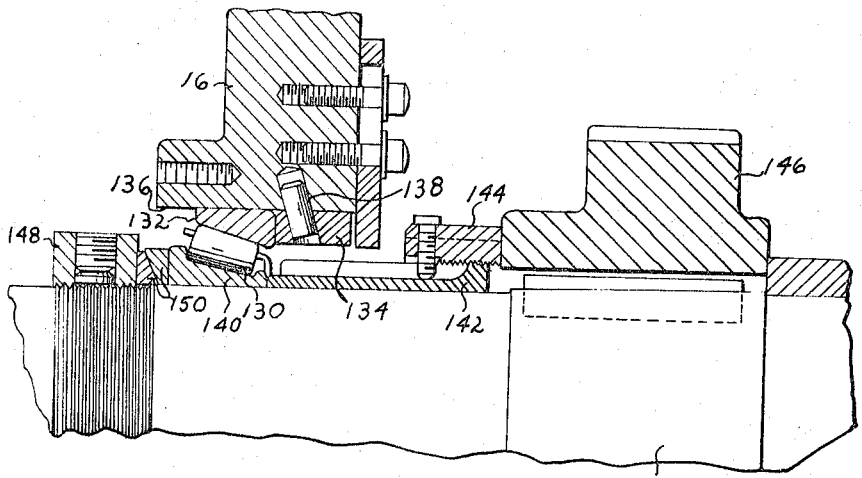
FIGURE 7 is a fragmentary sectional view indicated by line VII—VII on FIGURE 1 and illustrating the application of the principles of the present invention to an intermediate bearing of the spindle.

At intermediate bearing 22 of the spindle, the radial loading encountered is not really as great, but some provision for both radial and axial bearing support is advisable. With this in mind, FIGURE 7 shows a bearing arrangement according to the present invention for the intermediate region of the spindle. This bearing, also a tapered roller bearing, is indicated at 130 and includes an outer race 132 which abuts a ring 134 accurately fixed in bore 136 of the housing of headstock 16 by pin means 138. The inner race 140 of the bearing abuts a sleeve 142 on one side which carries a clamp nut 144 adapted to clamp against one side of one of the drive gears 146 mounted on the spindle.

The other side of race 140 is held on the spindle by nut 148 between which nut and the said inner race are the wedge rings 150 of the type that have been described in connection with FIGURE 2 at 62 and 64. The wedge ring adjacent race 40 is of a material, such as aluminum, which expands more rapidly than steel and thus, when bearing 130 increases in temperature, this temperature will be transmitted to the said wedge ring thereby causing the wedge ring to expand and permit relative movement between the bearing races that will prevent the development of any excessive pressures between the races and the bearing rollers.

Further compensation for stresses that may be developed in the bearings or on the spindle may be effected by selection of the material of sleeve 142. For example, if relative expansion of the wedge rings 150 was such as to permit the inner race of bearing 130 to move axially on the spindle while no movement of the spindle occurred, there might be a loosening in the right end of the inner race of the bearing. This can be compensated for by selection of the material of sleeve 142 so that this sleeve would expand to maintain a good fit against the right end of the inner race of bearing 130.

By the practice of the present invention, the spindle of a lathe or similar machine can be supported accurately against any axial movement of at least the workpiece end of the spindle which would result in an undesired shifting of the workpiece supported and driven by the spindle, while at the same time, long life of the supporting bearings for the spindle is insured because of the development of any excessive pressures therein. Furthermore, any desired pre-loading of the bearings to provide an accurate assembly and for accurate substantially non-yielding support of the spindle is accurately maintained by the arrangement of the present invention.

Combinations of materials for effecting the described axial adjustment in response to differential expansion of various materials will occur to those skilled in the art. Plastic materials and aluminum have been mentioned as materials which expand and contract from thermal influences at a different rate from steel, but it will further be understood that materials such as copper and the like could also be employed.

It will be understood that this invention is susceptible to modification in order to adapt it to different usages and conditions; and accordingly, it is desired to comprehend such modifications within this invention as may fall within the scope of the appended claims.

I claim:

1. A structure comprising first and second relatively rotatable members and a pair of spaced anti-friction tapered roller bearings therebetween with each bearing having a race pertaining to each member, and means for compensating for expansion of the structure due to an increase in temperature thereof whereby to prevent the development of excessive pressures in the bearings and to prevent change in axial position of a predetermined point on one of the members, said means comprising; means fixedly locating a first race of one bearing relative to its pertaining member, a sleeve member carried by the last mentioned member abutting between said first race and the corresponding race of the other bearing, and spaced abutment means on the other member engaging the other races of the bearings on the sides of the bearings opposite said sleeve member, at least one of said abutment means including ring elements having interengaging conical surfaces and expansible relatively in the radial direction upon an increase in temperature thereof and in a direction to increase the space between said abutment means.

2. A structure comprising first and second relatively rotatable members and a pair of spaced anti-friction tapered roller bearings therebetween with each bearing having a race pertaining to each member, and means for compensating for expansion of the structure due to an increase in temperature thereof whereby to prevent the developemnt of excessive pressures in the bearings and to prevent change in axial position of a predetermined point on one of the members, said means comprising; means fixedly locating a first race of one bearing relative to its pertaining member, a sleeve member carried by the last mentioned member abutting between said first race and the corresponding race of the other bearing, and spaced abutment means on the other member engaging the other races of the bearings on the sides of the bearings opposite said sleeve member, both of said abutment means including ring elements having interengaging conical surfaces and expansible relatively in the radial direction upon an increase in temperature thereof and in a direction to increase the space between said abutment means.

3. A structure comprising first and second relatively rotatable members and a pair of spaced anti-friction tapered roller bearings therebetween with each bearing having a race pertaining to each member, and means for compensating for expansion of the structure due to an increase in temperature thereof whereby to prevent the development of excessive pressures in the bearings and to prevent change in axial position of a predetermined point on one of the members, said means comprising; means fixedly locating a first race of one bearing relative to its pertaining member, a sleeve member carried by the last mentioned member abutting between said first race and the corresponding race of the other bearing, and spaced abutment means on the other member engaging the other races of the bearings on the sides of the bearings opposite said sleeve member, both of said abutment means including ring elements having interengaging conical surfaces and expansible relatively in the radial direction upon an increase in temperature thereof and in a direction to increase the space between said abutment means, and said sleeve member being expansible in the axial direction upon an increase in temperature.

4. A structure comprising first and second relatively rotatable members and a pair of spaced anti-friction tapered roller bearings therebetween with each bearing having a race pertaining to each member, and means for compensating for expansion of the structure due to an increase in temperature thereof whereby to prevent the development of excessive pressures in the bearings and to prevent change in axial position of a predetermined point on one of the members, said means comprising; means fixedly locating a first race of one bearing relative to its pertaining member, a sleeve member carried by the last mentioned member abutting between said first race and the corresponding race of the other bearing, and spaced abutment means on the other member engaging the other races of the bearings on the sides of the bearings opposite said sleeve member, said spaced abutment means including sleeves on said other member having outer end parts abuttingly engaging the said other races on the sides of the bearings opposite said sleeve member, the inner ends of said sleeves being spaced apart axially and having an external thread thereon with sloping flanks, and a nut threaded on said inner ends of the sleeves and expansible radially relative thereto upon an increase in temperature thereof to permit said sleeves to move apart.

5. A structure comprising first and second relatively rotatable members and a pair of spaced anti-friction tapered roller bearings therebetween with each bearing having a race pertaining to each member, and means for compensating for expansion of the structure due to an increase in temperature thereof whereby to prevent the development of excessive pressures in the bearings and to prevent change in axial position of a predetermined point on one of the members, said means comprising; means fixedly locating a first race of one bearing relative to its pertaining member, a first sleeve member carried by the last mentioned member abutting between said first race and the corresponding race of the other bearing, and spaced abutment means on the other member engaging the other races of the bearings on the sides of the bearings opposite said sleeve member, said spaced abutment means including a second sleeve on said other member having end parts engaging said other races on the sides of said bearings opposite said first sleeve member, said second sleeve being expansible axially in response to an increase in temperature thereof, said second sleeve being fixed at one end to said other member.

6. A structure comprising first and second relatively rotatable members and a pair of spaced anti-friction tapered roller bearings therebetween with each bearing having a race pertaining to each member, and means for compensating for expansion of the structure due to an increase in temperature thereof whereby to prevent the development of excessive pressures in the bearings and to prevent change in axial position of a predetermined point on one of the members, said means comprising; means fixedly locating a first race of one bearing relative to its pertaining member, a first sleeve member carried by the last mentioned member abutting between said first race and the corresponding race of the other bearing, and spaced abutment means on the other member engaging the other races of the bearings on the sides of the bearings opposite said sleeve member, said spaced abutment means including a second sleeve on said other member having end parts engaging said other races on the sides of said bearings opposite said first sleeve member, said second sleeve being expansible axially in response to an increase in temperature thereof, said second sleeve being fixed at one end to said other member, said second sleeve being axially slotted to eliminate the effect of radial expansion thereof.

7. A structure comprising first and second relatively rotatable members and a pair of spaced anti-friction tapered roller bearings therebetween with each bearing having a race pertaining to each member, and means for compensating for expansion of the structure due to an increase in temperature thereof whereby to prevent the development of excessive pressures in the bearings and to prevent change in axial position of a predetermined point on one of the members, said means comprising; means fixedly locating a first race of one bearing relative to its pertaining member, a first sleeve member carried by the last mentioned member abutting between said first race and the corresponding race of the other bearing, and spaced abutment means on the other member engaging the other races of the bearings on the sides of the bearings opposite said sleeve member, said spaced abutment means including a second sleeve on said other member having end parts engaging said other races on the sides of said bearings opposite said first sleeve member, said second sleeve being expansible axially in response to an increase in temperature thereof, said second sleeve being fixed at one end to said other member, said second sleeve being fitted closely to said other member by being axially movable thereon as said sleeve expands, and the said races pertaining to said other member being supported on said sleeve.

8. A structure according to claim 1 in which one of said ring elements is a plastic material having a relatively high coefficient of thermal expansion.

9. A structure according to claim 1 in which one of said rings is aluminum and therefore has a relatively high coefficient of thermal expansion.

10. A structure according to claim 1 in which one of said rings is copper.

11. A structure according to claim 5 in which said sleeve is a plastic material having a relatively high coefficient of thermal expansion.

12. A structure according to claim 5 in which said sleeve is a metal selected from the class which includes copper and aluminum.

13. A structure comprising first and second relatively rotatable members and a pair of spaced anti-friction tapered roller bearings therebetween with each bearing having a race pertaining to each member, and means for compensating for expansion of the structure due to an increase in temperature thereof whereby to prevent the development of excessive pressures in the bearings and to prevent change in axial position of a predetermined point on one of the members, said means comprising; means fixedly locating a first race of one bearing relative to its pertaining member, a sleeve member carried by the last mentioned member abutting between said first race and the corresponding race of the other bearing, and spaced abutment means on the other member engaging the other races of the bearings on the sides of the bearings opposite said sleeve member, said abutment means including temperature sensitive means expansible upon increase of temperature thereof and operable upon expansion to increase the space between said abutment means to compensate for expansion of the bearing means.

References Cited by the Examiner

UNITED STATES PATENTS

| | | | |
|---|---|---|---|
| 1,746,978 | 2/1930 | Winkler | 308—207.1 |
| 1,867,582 | 7/1932 | McCray | 308—207.1 |
| 2,711,356 | 6/1955 | Ensinger | 308—178 |
| 2,727,796 | 12/1955 | Sardou | 308—178 |
| 3,106,432 | 10/1963 | Opferkuch | 308—36 |

MARTIN P. SCHWADRON, *Primary Examiner.*

FRANK SUSKO, *Examiner.*